March 15, 1938. R. G. TAYLOR 2,111,081
BOX NAILING MACHINE
Filed Feb. 8, 1937 8 Sheets-Sheet 1

INVENTOR
Roy G. Taylor
BY
ATTORNEY

March 15, 1938. R. G. TAYLOR 2,111,081
BOX NAILING MACHINE
Filed Feb. 8, 1937 8 Sheets-Sheet 2
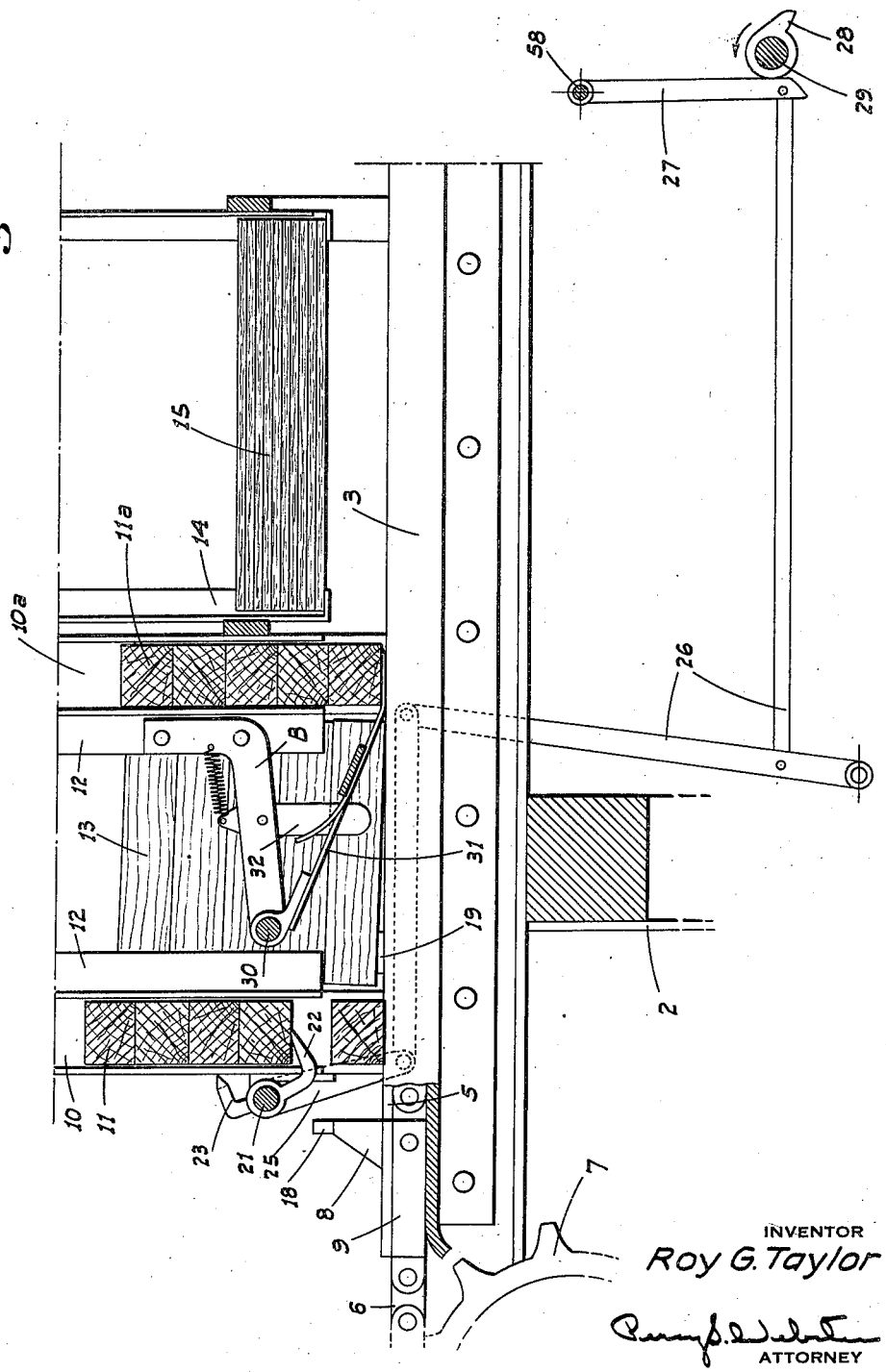
INVENTOR
Roy G. Taylor
ATTORNEY

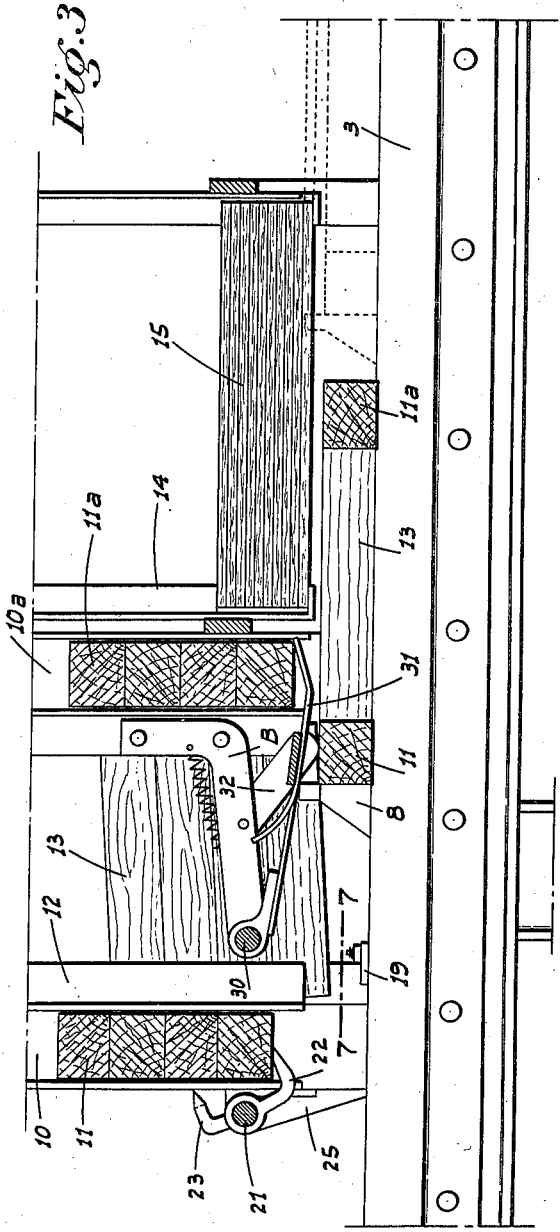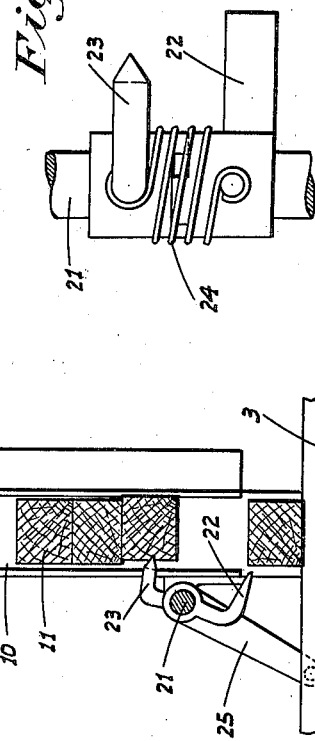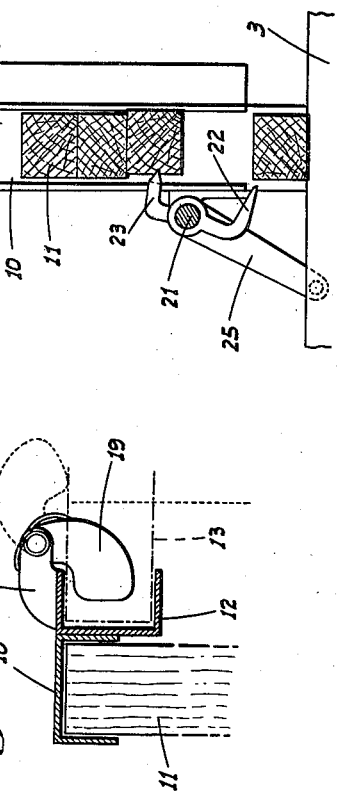

March 15, 1938.　　　R. G. TAYLOR　　　2,111,081

BOX NAILING MACHINE

Filed Feb. 8, 1937　　8 Sheets-Sheet 4

INVENTOR
Roy G. Taylor
BY
ATTORNEY

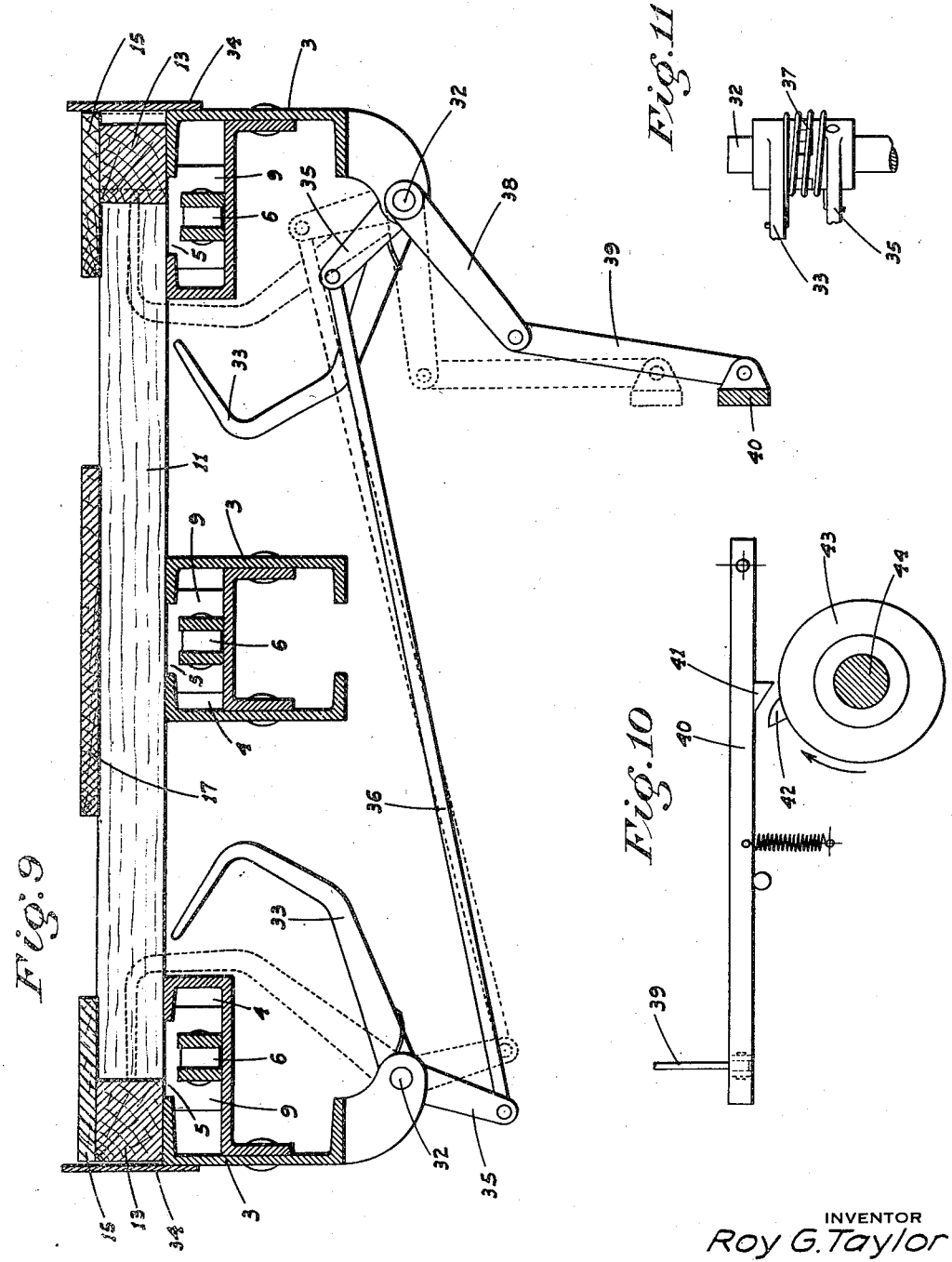

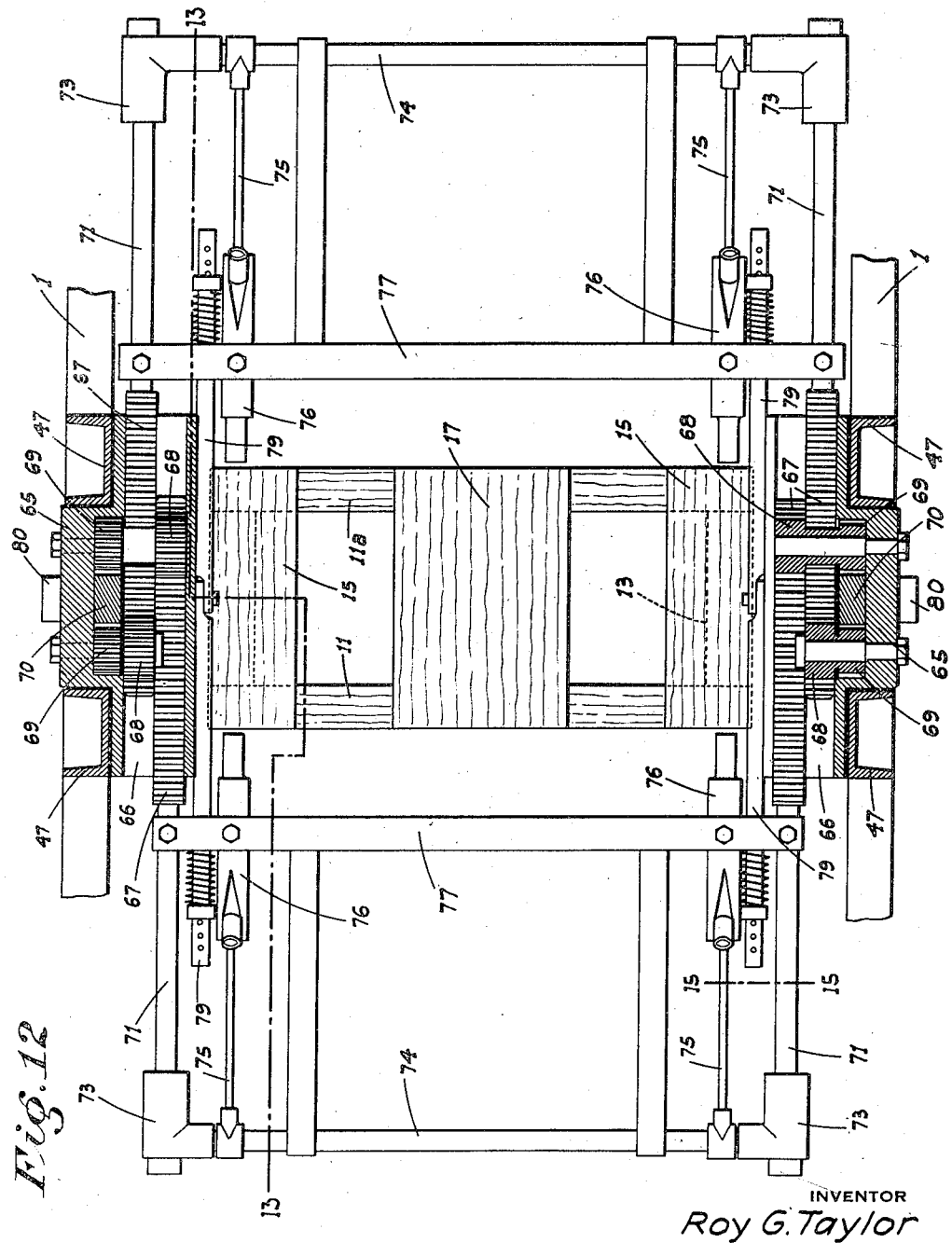

March 15, 1938.  R. G. TAYLOR  2,111,081
BOX NAILING MACHINE
Filed Feb. 8, 1937  8 Sheets-Sheet 7
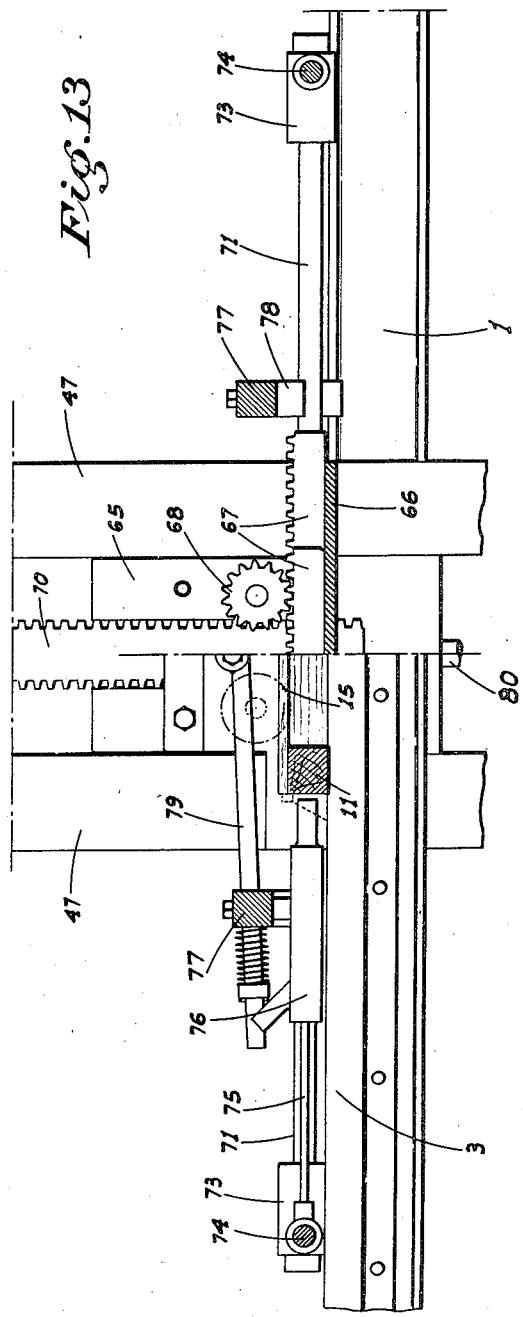
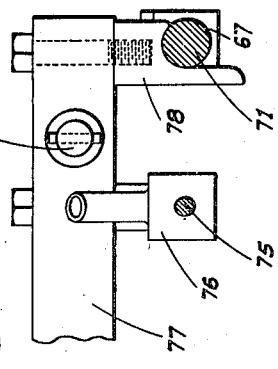
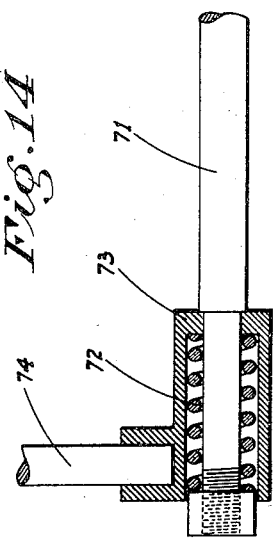
INVENTOR
Roy G. Taylor
BY
ATTORNEY March 15, 1938. R. G. TAYLOR 2,111,081
BOX NAILING MACHINE
Filed Feb. 8, 1937 8 Sheets-Sheet 8

INVENTOR
Roy G. Taylor
BY
ATTORNEY

Patented Mar. 15, 1938

2,111,081

UNITED STATES PATENT OFFICE 2,111,081

BOX NAILING MACHINE

Roy G. Taylor, San Jose, Calif., assignor to American Box Corporation, San Francisco, Calif., a corporation Application February 8, 1937, Serial No. 124,620

22 Claims. (Cl. 1—14)

The invention relates to box nailing machines and particularly to one for making crate heads for lettuce and other produce crates, and which consist of a frame made of rails and posts, and spaced slats or panels superimposed on the frame.

The principal object of my invention is to provide an improved and simplified machine for arranging and feeding the various head parts in proper assembled order to the nailing machine, and for then actuating the latter, both to nail the slats on the frame and to simultaneously spike the rails and posts together, all in automatic and timed relation. No manual attention is therefore necessary in the operation of the machine other than to see that the parts hoppers and nail receptacles are kept supplied.

A further object is to provide a machine for the purpose which is relatively simple in its construction and compact in size, while having a large output capacity.

These objects I accomplish by means of such structure and relative arrangement of parts as will fully appear by a perusal of the following specification and claims.

In the drawings similar characters of reference indicate corresponding parts in the several views:

Figure 2 is a fragmentary sectional elevation showing the parts hoppers and the advancing lugs about to engage a rail.

Figure 3 is a similar view showing the rails and posts to constitute a frame, advanced from under their hoppers.

Figure 5 is a fragmentary section showing the rail holding means as tripped to place another rail in position for advance.

Figure 6 is an enlarged top plan view of a rail holding unit detached.

Figure 7 is an enlarged sectional plan taken on the line 7—7 of Fig. 3.

Figure 9 is a fragmentary enlarged cross section showing the post straightening or positioning mechanism.

Figure 10 is a fragmentary longitudinal view showing the actuating means for said mechanism.

Figure 11 is a fragmentary plan view showing the yieldable connection between the cooperating arms of each positioning member.

Figure 12 is a sectional plan substantially on the line 12—12 of Fig. 1 showing the spiking mechanism.

Figure 13 is a longitudinal section on the line 13—13 of Fig. 12.

Figure 14 is a sectional plan showing the cushion mounting of the spiker-plunger supporting bar.

Figure 15 is a fragmentary cross section on the line 15—15 of Fig. 12.

Figure 1:
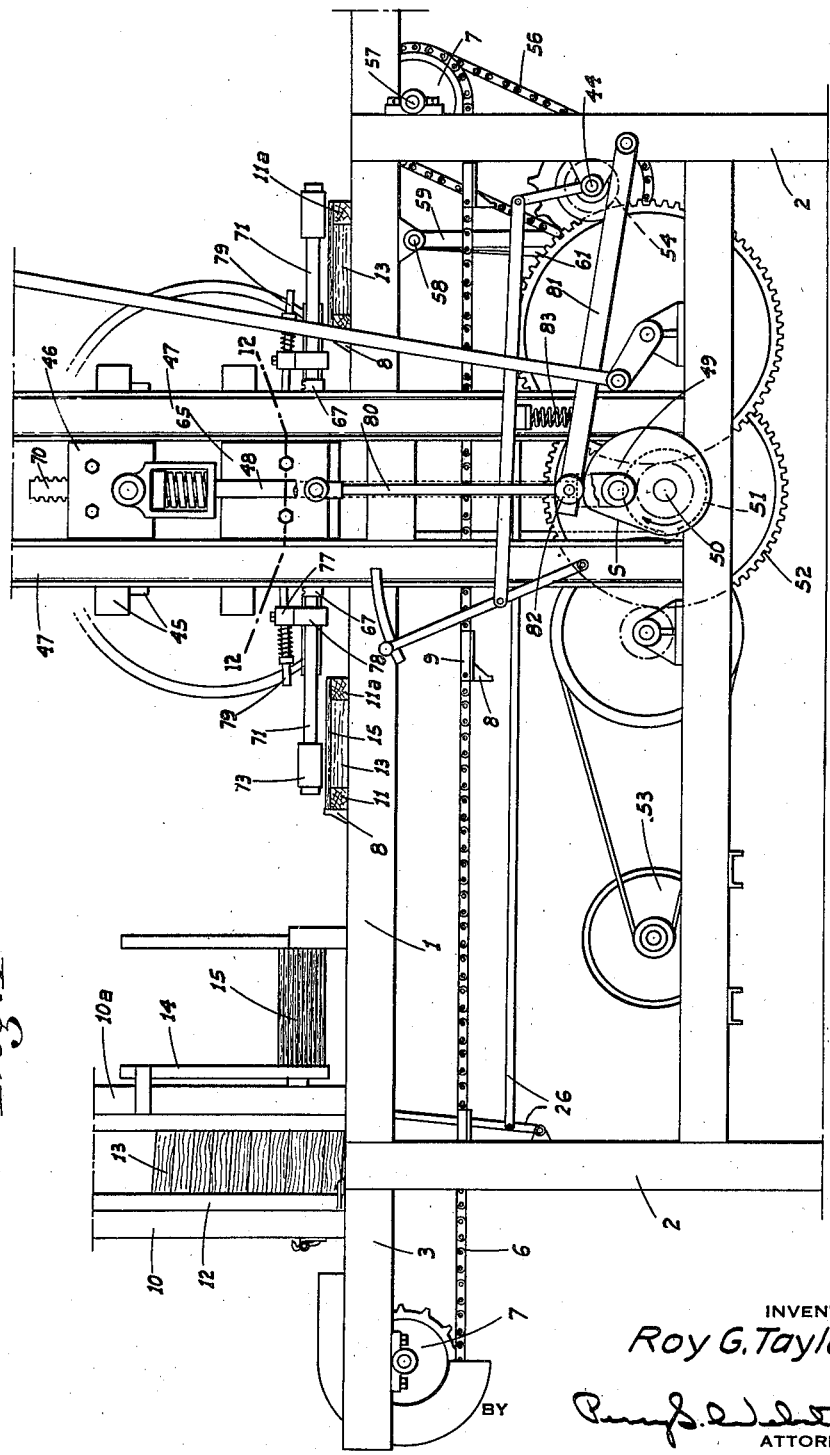
Figure 1 is a side elevation of the machine.
Figure 4:
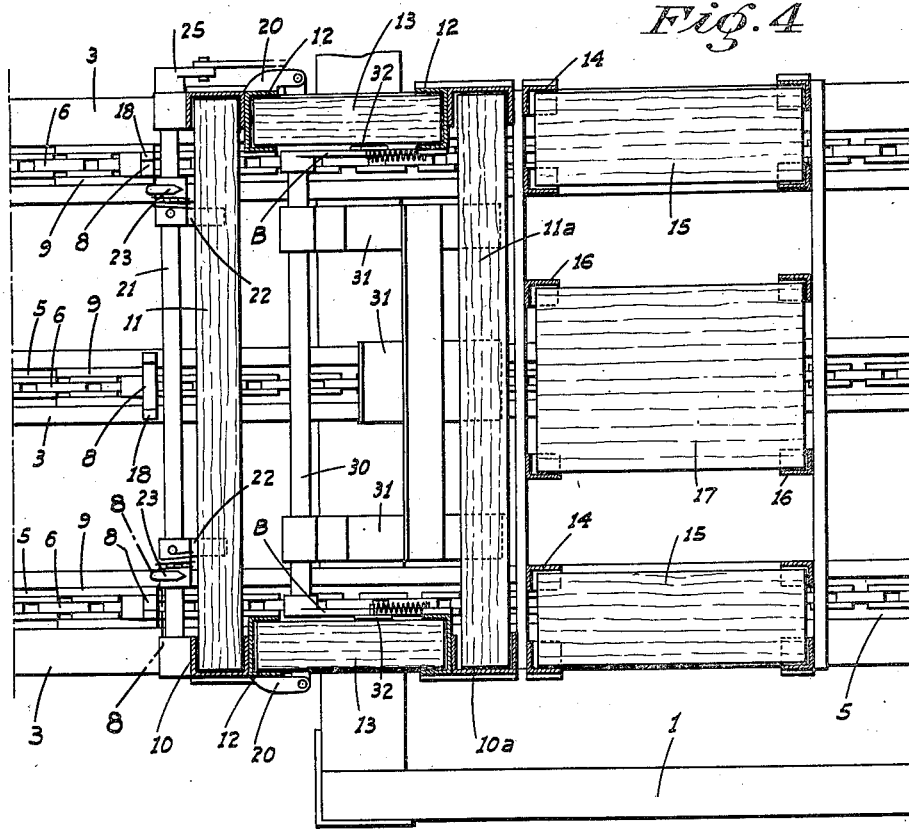
Figure 4 is a sectional plan of the structure shown in Fig. 2, with the parts in the same position.

Referring now more particularly to the characters of reference on the drawings, the frame of the machine comprises main side beams 1 directly supported on legs 2, and auxiliary built-up frame members 3 inwardly of the beams 1 but on the same level, one of the members 3 being centrally of the width of the frame. The members 3 are formed with longitudinal channels 4 open to the top through relatively narrow slots 5 (see Fig. 8).

Figure 8:
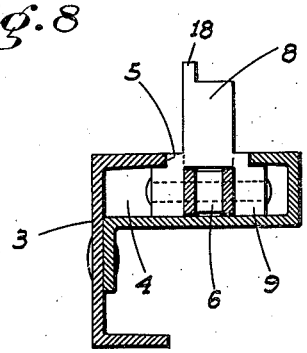
Figure 8 is an enlarged cross section on the line 8—8 of Fig. 4.
Figure 16:
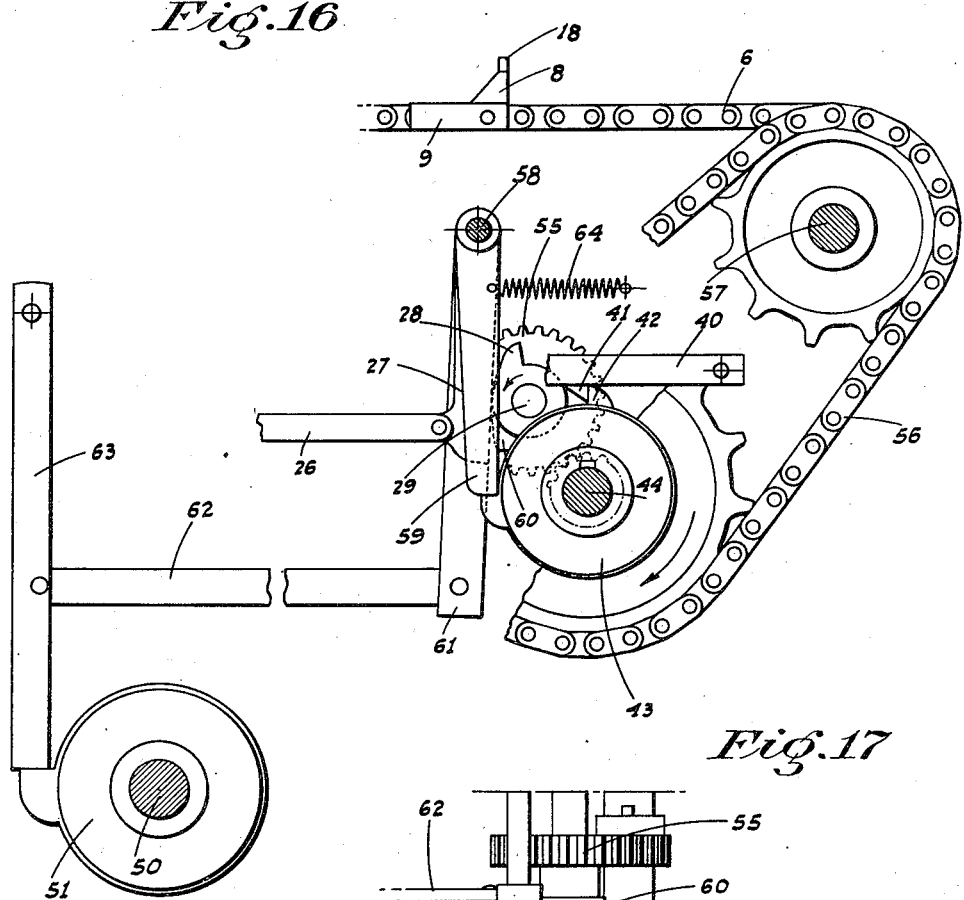
Figure 16 is a side view of the automatic control means for the operating mechanisms of the machine.
Figure 17:
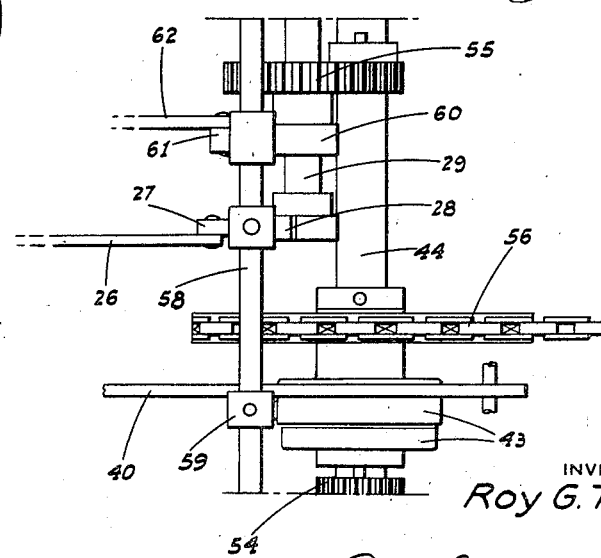
Figure 17 is a fragmentary top plan view of the same.

Endless chains 6 mounted on end sprockets 7 are disposed with their upper runs riding in and resting on the bottom of the channels 4. Lugs 8 project outwardly from the chains at intervals, said lugs being secured on blocks 9 mounted on and straddling certain links of the chains, being pivoted in connection with one link. The blocks project in guided relation through the channel slots 5 to the level of the top of members 3 as shown in Fig. 8. The blocks below the slots are wider than said slots so that they cannot rock on their pivots while they are in the slots.

Upstanding from the frame adjacent one end of the same are longitudinally spaced hoppers 10 and 10a for stacks of rails 11 and 11a of the crate heads, the spacing of the hoppers being slightly greater than the actual width of a head when assembled. The length of the rails is such that their ends are substantially flush with the outer edges of the outer members 3. Disposed between the rail hoppers in overhanging relation to the outer portions of the outer members 3 are hoppers 12 for stacks of posts 13, the bottom ones of which are thus supported on and extend parallel to said outer portions of the members 3. A pair of rails and posts form the frame for a crate head.

Mounted beyond the rail hoppers in overhanging relation to the outer members 3 are hoppers 14 for stacks of slats 15, while other hoppers 16 are disposed centrally between the hoppers 14 for stacks of panels 17. The hoppers 14 and 16 are arranged so that the lowest slats and panels are above the level of the lowest rails and posts. The lugs 8 have extensions 18 adapted to engage the edges of said lowest slats and panels, and it will be understood that the lugs on the three chains all lie in common alinement transversely of the machine, so that they all engage a rail and subsequently a pair of slats and a panel, simultaneously.

As the upper runs of the chains move under the hoppers therefor, certain lugs first engage and advance the lowest rail 11, which almost immediately contacts with the adjacent posts 13 and advances them. These posts then engage and advance the lowest rail 11a, and said rails and posts move as an assembled unit under the slat and panel hoppers. When the lug extensions 18 reach the adjacent edges of the lowest slats and panels, they advance them out of their hoppers, and being directly above the rail and post unit, drop in place thereon as soon as they are clear of the hoppers.

The posts and rails while theoretically the same height may vary somewhat. To prevent a rail 11 from possibly catching against a post in its hopper above the lowest one, the adjacent ends of the lowest posts are each held raised somewhat by a plate 19. This plate is pivoted on a bracket 20 for outward swinging movement clear of the path of the rail 11, and is engaged and thus moved by the advancing rail as indicated in Fig. 7, so that the movement of the rail is not obstructed.

The stack of rails 11 tend to rest on each other and to releasably hold the rail above the lowest one in spaced relation thereto while the latter is being advanced, and so as to clear the lug extensions 18, I provide the following control device:

Fixed on a shaft 21 pivoted behind the hopper 10 and above the lugs are fingers 22, which depend from said shaft and then are bent to underhang and support the second rail in the stack in spaced relation to the lowest rail as shown in Fig. 3.

Turnably mounted on the shaft adjacent the finger for limited rotation relative thereto are prong elements 23. These upstand from the shaft and are then bent toward the rails in position to impale the backside of the third rail in the stack. These elements are urged toward said rail by a spring 24 but are held clear of the same when the fingers are engaging the rail below. By means of this device it will be seen that if the shaft is rotated so that the fingers are drawn from under the second rail, the latter will drop onto the supporting members 3, while the prongs are moved to impale the third rail and hold the same from dropping as shown in Fig. 5. When the unit is returned to its original position, the fingers again project under the rail hopper, the prongs release the rail with which they have been engaged and said rail drops onto the fingers ready to be released with a subsequent action of the holding unit.

The movement of the shaft 21 necessary to thus actuate the holding units is controlled in timed relation with the operation of the machine by an arm 25 depending from one end of the shaft 21. This arm is actuated by a suitable link connection 26 with another pivoted arm 27 positioned to be oscillated by a cam 28 mounted on a continuously driven shaft 29 of the machine as will be seen later.

To likewise hold the second rail 11a of the corresponding stack clear of the path of movement of the rail 11 as the latter is passing under the hopper 10a, I provide the following means:

Pivoted on a transverse shaft 30 fixed on brackets B between the hoppers 10 and 10a and a suitable distance above the members 3 are rigid strips 31, disposed in alinement with the lugs 8. These strips slope down to and under the lowest rail 11a, holding the entire stack raised slightly and preventing possible contact of the posts with the second rail in the stack as the posts advance. As said lowest rail 11a is advanced from under the hopper 10a by the posts, the second rail in said stack temporarily rests on said advancing posts. As the rail 11 advances, it engages and lifts the strips 31 and the entire stack of rails 11a. The strips are then engaged and held raised by the lug extensions 18 until the rail 11 is beyond the hopper 10a. The strips are then released and dropped, allowing another rail 11a to move into position for engagement by the next pair of posts as they are advanced.

To prevent possible shifting of the lowest posts laterally from their hoppers (which must be open on the inner side at the bottom for the passage of rails 11) upwardly yieldable strips 32 are pivoted on and depend just inwardly of the posts from the brackets B.

The assembled parts constituting a complete crate head are thus advanced some distance beyond the hopper until they are disposed under a vertical nailing machine, when the movement of the advance is automatically halted as will be seen later. Just before this halting takes place but after the crate head is substantially in a nailing position, the posts if they have shifted inwardly from their proper position on the members 3 are pushed out and returned to such position by the following means:

Turnable on stub shafts 32 turnably supported from and under the outer members 3 are pusher fingers 33, located centrally under the nailing machine. These are shaped to extend over said members 3 from inwardly of the same and to engage the inner faces of the posts and press the same against upstanding guide plates 34 extending along the outer edges of the members 3, upon rotation of said fingers from a predetermined normal position. When the fingers are in said normal position, their upper ends are inwardly of and below the level of the members 3 as shown in Fig. 9, so as not to interfere with the advancing of the crate head into a nailing position.

Fixed on the shafts 32 are relatively short arms 35, one projecting up and the other one down, and connected by a rod 36. The hubs of the arms and fingers are associated with each other to permit of only limited rotation of the fingers relative to the arms and shafts, with springs 37 yieldably urging the fingers toward the posts. This yieldable mounting of the fingers of course prevents possible damage being done to the same in the event that some posts are wider than others as may be the case.

The fingers are thus moved simultaneously from their normal lowered position by an arm 38 secured on one of the shafts 32, and which is connected by a depending link 39 with the free end of a horizontal bar 40 pivoted in a fixed position at its opposite end. This bar has a depending lug 41 intermediate its ends adapted to be intermittently engaged, so as to cause the bar to be raised, by a cam 42 mounted on the loose member of a friction clutch 43 mounted on a constantly driven shaft 44 as will be seen later.

The nailing machine whereby nails are driven vertically through the slats and panels at various points and into the rails and posts, is of standard character. It includes a vertically movable head 45 carrying the nailing plungers and having side blocks 46 guided by the uprights 47 upstanding from the frame beams intermediate their ends. The head is intermittently reciprocated through a complete stroke after a crate head has come to rest under the nailing machine by the conventional mechanism. This mechanism comprises rods 48 depending from the blocks 46 to connections with cranks 49 mounted on a transverse shaft 50, with the usual friction clutch 51 between said shaft and its driving gear 52. When the clutch is disengaged the rods 48 and attached parts are at the top of the stroke.

The gear 52 is driven from a motor 53 and is included in a gear train which drives a pinion 54 on the shaft 44. The shaft 29 is parallel to the shaft 44 and is connected thereto by gearing 55 which rotates said shaft 29 at a reduced speed. A chain drive 56 connects the loose clutch member 43 with the shaft 57 of the rear sprockets of the said chains.

Fixed on and depending from the rock shaft 58 on which the arm 27 is secured is another arm 59 adapted at its lower end to engage and hold the clutch element 43 against rotation when the cam 28 is clear of the arm 27, so that the chain drive 56 and the feed chains will then be held stationary even though the shaft 44 is continuously rotating.

Besides the cam 28, the shaft 29 has another cam 60 fixed thereon circumferentially spaced from said cam 28 and adapted to engage and rock an arm 61 turnable on the shaft 29. This arm 61 is connected by a link 62 with the clutch control arm 63 of the nailing machine control shaft 51. These parts are arranged so that just after the cam 60 has released the arm 63 to cause the clutch 51 to be held or disengaged (which is when the rods 48 are at the top of the stroke as previously described) the cam 28 moves the arm 27 and thus moves the arm 59 and releases the same from holding engagement with the clutch element 43. This causes the clutch to be driven by its cooperating element fixed on the rotating shaft 44, driving the feed chains and advancing the crate head parts as previously described for a full revolution of the shaft 44, which is sufficient to advance the parts the necessary distance.

As soon as the cam 28 leaves the arm 27, the latter returns to a position to hold the clutch element 43 upon rotation of the shaft 44 being completed, by means of a spring 64. Just before the driving of the chains is halted, the bar 40 is lifted by the cam 42 to actuate the post positioning mechanism as previously described. When the chains are halted the continued rotation of the shaft 29 causes the cam 60 to engage and push the arm 61 to a position clear of its holding relation with the clutch 51, causing the shaft 50 to be driven and the nailing machine to be actuated.

In connection with the operation of the vertical nailing machine, a horizontal spiker mechanism is also actuated to drive nails through the rails and into the posts at both ends of the latter. This mechanism is constructed and operated as follows:

Slidable between the uprights 47 below the blocks 46 are other blocks 65, provided inwardly of the uprights with horizontal ledges 66 extending lengthwise of the machine. These ledges each slidably support a pair of upwardly facing rack bars 67 disposed in overlapping side by side relation. These racks are separately engaged by gears 68 formed as a unit with pinions 69 mounted in the blocks 65 in horizontally spaced relation. Vertical double faced racks 70 are secured in the upper blocks 46 and slidably project through the blocks 65 in engagement with both adjacent pinions 69.

The racks are connected at their outer ends to rigid extension rods 71 which at their outer ends are cushion mounted as at 72 in fittings 73. Cross rods 74 extend between these fittings and support nailing plungers 75 which extend toward each other from the opposite cross rods. The plungers engage and cooperate with horizontal nail chucks 76 of standard form disposed on opposite sides of the crate head when the latter is in a nailing position as shown in Fig. 12, and are in longitudinal alinement with the posts 13.

The chucks are mounted on cross bars 77 having saddles 78 riding on the rods 71. The bars 77 are yieldably held in a certain position lengthwise of the machine by spring engaged links 79 loosely projecting through said bars and extending behind and pivoted on the blocks 65. The bars 77 and the nailing chucks may thus move vertically without their longitudinal position changing appreciably.

Pivoted on and depending from each block 65 on the outside is a rod 80, connected at its lower end on the adjacent free end of a substantially horizontal lever 81 which is pivoted at its opposite end on a frame leg 2. At its free end the lever carries a roller 82 riding on a cam surface S formed as part of the adjacent crank 49; said roller being pressed against the cam by a spring 83 engaging the lever 81.

The cam surface is continuous about the shaft 50 and is arranged so that when the rod 48 is at the top of its stroke, the rod 80 is also at the highest point on the cam, which is a greater distance from the center of the shaft 50 than is the crank pin of the rod 48. In this position of the parts, the blocks 65 are raised so that the horizontal racks and all parts connected thereto (which constitute the spiking mechanism) are disposed above and clear of the crate head, allowing the latter to be advanced into position under the nailing machine as shown in Fig. 1.

When the shaft 50 is rotated upon the engagement of the clutch 51, the blocks 46 and the nailing head are lowered, the blocks 65 being also lowered at the same rate for the first portion of lowering movement of the blocks 46, due to the shape of the adjacent portion of the cam surface S. This lowering of the blocks 65 is sufficient to lower the spiking mechanism to a proper operating level. The cam surface is then arranged to cause the lever 81 to remain stationary while the blocks 46 continue to descend to the bottom of the stroke, and thus effect the vertical nailing operation.

This further descent of the blocks 46 while the blocks 65 remain stationary, causes a downward movement of the vertical legs 70 through said blocks 65. Rotation is thus imparted to the pinions 69 and gears 68. This moves the horizontal racks 67 lengthwise, the gears 68 being arranged so that with such rotation, the racks 67 are moved sufficiently and in the direction necessary to cause the plungers 75 to engage and force the nails in the chucks 76 into the rails and posts.

When the rods 48 reach the bottom of the stroke and thus complete the vertical nailing operation, further rotation of the shaft 50 again lifts said rods and the nailing head, and the cam surface S is shaped so that with this upward movement of said rods, the blocks 46 and 65 gradually separate while the latter are being raised. The racks 67 are thus moved to retract the plungers from the chucks while at the same time the spiker mechanism as a whole is again raised clear of the nailed crate head. This of course enables the latter to be discharged from under the nailing machine and a new one to be advanced into nailing position with the subsequent operation of the feed chains.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a nailing machine for crate heads which comprise a frame consisting of rails and posts arranged in rectangular form and slats on said frame; supports, rail hoppers spaced along said supports to receive stacks of rails extending transversely of and over the supports, post hoppers between the rail hoppers to support stacks of posts at right angles to and between the rails adjacent the ends thereof, slat hoppers beyond the first named hoppers and arranged to hold the lowermost slats above the level of a rail on the supports, lugs upstanding from and movable along the supports to engage the back of the rail furthest from the slat hoppers, means to advance said lugs in the direction of the slat hoppers, extensions on and projecting above the lugs to engage against the edges of the lowest slats in their hoppers, and means functioning to hold the rails next above the lowest ones in the stacks clear of the extensions as the latter pass under the upper rails.

2. A structure as in claim 1 in which said holding means for the rails in the hopper furthest from the slat hoppers comprises fingers to engage under and support the rail next to the lowest one in spaced relation thereto, and means functioning in timed relation with the operation of the advancing elements to intermittently withdraw the finger from under the rail supported thereby.

3. A structure as in claim 1 in which said holding means for the rails in the hopper furthest from the slat hoppers comprises fingers to engage under and support the rail next to the lowest one in spaced relation thereto, means functioning in timed relation with the operation of the advancing elements to intermittently withdraw the finger from under the rail supported thereby and prongs mounted as a unit with the fingers to engage and hold the rail next above the one initially engaged by the fingers only when the fingers are withdrawn from under said rail.

4. A structure as in claim 1 in which the holding means for the rails in the hopper nearest the slat hoppers comprises rigid strips extending upwardly toward the other rail hopper from under the lowest rail in said near hopper to a height above the depth of the rail, said strips lying in transverse alinement with the lugs, and means pivotally supporting said strips at their upper end.

5. In a nailing machine for crate heads which comprise a frame consisting of rails and posts arranged in rectangular form and slats on said frame; supports, rail hoppers spaced along said supports to receive stacks of rails extending transversely of and over the supports, post hoppers between the rail hoppers to support stacks of posts at right angles to and between the rails adjacent the ends thereof, lugs movable in a plane parallel to and lengthwise of the supports to engage against the outer face of the lowest rail in one hopper and advance the same against the adjacent ends of the lowest posts, and means functioning to prevent possible engagement of said rail with the posts next above the stack in the event that said lowest post is of a lesser depth than the rail; said last named means comprising plates disposed under the posts at their ends nearest the rail whereby to tilt said ends upwardly, and means mounting the plates for lateral outward movement when engaged by the adjacent face of the advancing rail.

6. In a machine for nailing crate-head frames which include rails and posts assembled in rectangular form, spaced supports for the rails and posts disposed parallel to the latter, a nailing mechanism above the supports, means to advance the assembled parts lengthwise of the supports from beyond the nailing mechanism to a position under the same for nailing, upstanding post guides to engage the outer faces of the posts when the latter reach said nailing position, and means to engage the posts when in such position to shift the posts laterally and against the guides.

7. In a machine for nailing crate-head frames which include rails and posts assembled in rectangular form, spaced supports for the rails and posts disposed parallel to the latter, a nailing mechanism above the supports, means to advance the assembled parts lengthwise of the supports from beyond the nailing mechanism to a position under the same for nailing, upstanding post guides to engage the outer faces of the posts when the latter reach said nailing position, means to halt the operation of the advancing means when the posts reach such nailing position, and means operated in conjunction with the advancing means to engage the inner faces of the posts and shift them laterally and against the guides immediately prior to the operation of the halting means.

8. In a machine for nailing crate-head frames which include rails and posts assembled in rectangular form, spaced supports for the rails and posts disposed parallel to the latter, a nailing mechanism above the supports, means to advance the assembled parts lengthwise of the supports from beyond the nailing mechanism to a position under the same for nailing, upstanding post guides to engage the outer faces of the posts when the latter reach said nailing position, fingers shaped and adapted to engage the inner faces of the posts and move them laterally apart and against the guides, means pivotally mounting the fingers in connection with and between the supports for movement in a transverse plane from a post engaging position to one below the top of the supports, and means functioning with the operation of the advancing means to move said fingers to a post engaging position just as the assembled head reaches a nailing position.

9. A structure as in claim 8 in which said finger moving means is initially applied to the pivot mounting means of one finger, with connections between said mounting means of both fingers to cause the other finger to be turned in the opposite direction from said one finger with the functioning of said finger moving means.

10. In a machine for nailing crate-head frames which include rails and posts assembled in rectangular form, spaced supports for the rails and posts disposed parallel to the latter, a nailing mechanism above the supports, means to advance the assembled parts lengthwise of the supports from beyond the nailing mechanism to a position under the same for nailing and including a rotary member, means to halt the rotation of said member when the posts have reached a nailing position, upstanding post guides to engage the outer faces of the posts when the latter reach said nailing position, means to engage and shift the posts apart and into contact with the guides, and operating means for the post shifting means including a pivoted arm, whose rocking in one direction actuates the post shifting means, and a cam on said rotary member to thus rock the arm and positioned relative to the halting means to be effective immediately prior to the operation of said halting means.

11. In a machine for nailing crate head frames which include rails and posts assembled in rectangular form, supporting means for the assembled parts, means to advance the parts to a predetermined position for nailing in a direction lengthwise of the posts, a nailing mechanism to drive nails through the rails and into the posts, said mechanism including relatively fixed nail chucks alined with the posts and normally retracted plungers movable into the chucks to force nails therefrom, means mounting the mechanism for limited vertical movement and normally maintaining the same above the crate head parts, and means operating in timed conjunction with the operation of the advancing means and in continuous sequence to first lower the mechanism to a nailing position and then advance the plungers after the parts have been advanced to said predetermined position.

12. In a machine for nailing crate head frames which include rails and posts assembled in rectangular form, supporting means for the assembled parts, a vertically movable nailing head above the supporting means, means to advance the parts from beyond the head to a nailing position under the same, a nailing mechanism to drive nails through the rails and into the posts, means mounting said mechanism for downward movement from a position above the crate parts to a cooperating nailing position therewith, means to lower the nailing head to effect a nailing operation, and means between said head lowering means and the nailing mechanism to first lower the same to a nailing position and then actuate the same to effect a nailing operation coincident with the nailing operation of said head.

13. In a machine for nailing crate head frames which include rails and posts assembled in rectangular form, supporting means for the assembled parts, a vertically movable nailing head above the supporting means, means to advance the parts from beyond the head to a nailing position under the same, a nailing mechanism to drive nails through the rails and into the posts, and including relatively fixed nail chucks alined with the posts and normally retracted plungers movable into the chucks to force nails therefrom, supporting means for the plungers including racks parallel to the plungers, vertically movable side blocks on which said plunger racks are slidably supported, means mounting the chucks as a unit with the blocks, means acting on the blocks to normally hold the mechanism clear above the crate parts and controlling the lowering of the same to a nailing position, means functioning with the lowering of the blocks to lower the nailing head a greater distance than the blocks to effect a nailing operation, and means between the head and mechanism and acting to shift the racks lengthwise in a direction to advance the plungers with the lowering movement of the nailing head after the mechanism has been lowered.

14. A structure as in claim 13, in which said last named means includes vertical racks secured on the head at the sides and slidably projecting through the blocks to one side of the corresponding horizontal racks, pinions mounted in the blocks and engaging the vertical racks, and gears fixed with the pinions and engaging the adjacent horizontal racks.

15. A structure as in claim 13 in which the actuating means for each block comprises a rotary cam below said block, a rod depending from the block, and a roller on the rod riding on the cam; said cam being arranged to allow the block to lower only a predetermined distance with the initial rotation of the cam and to then maintain the block stationary during a further predetermined amount of rotation of the cam; and said nailing head lowering means comprises a depending rod pivoted in connection with the cam in eccentric relation to the axis of the cam and in such position that when said nailing rod is at the top of its stroke, the roller is at the high point of the cam.

16. A structure as in claim 6, in which said last named means comprises fingers normally clear of the advanced posts inwardly thereof and mounted for movement against their inner faces to shift them against the guides, and means functioning with the operation of the advancing means to move the fingers as the assembled head reaches a nailing position.

17. A structure as in claim 6, in which said last named means comprises fingers normally clear of the advanced posts inwardly thereof and mounted for movement against their inner faces to shift them against the guides, and means functioning with the operation of the advancing means to move the fingers as the assembled head reaches a nailing position, the finger moving means including a yieldable spring connection arranged to allow of continued operation of said moving means after the posts have been engaged with the guides and are thus held against further movement.

18. A structure as in claim 1, in which the holding means for the rails in the hopper nearest the slat hoppers comprises vertical movable elements projecting under the lowest rail in said near hopper in supporting relation to such rail, and means acting on the elements to lift the same, after said lowest rail has been engaged by the ends of the lowest posts and advanced clear of the corresponding hopper, to a height sufficient to hold the adjacent rail at a level such that the lug extensions may pass under said rail in clearance relation.

19. In a machine for nailing crate head frames which include rails and posts assembled in rectangular form with the posts between the rails, means to advance the assembled parts to a predetermined position for nailing in a direction lengthwise of the posts, a nailing mechanism to drive nails through the rails and into the posts lengthwise of the latter and from both ends thereof, whereby said mechanism when in nailing position is in the path of movement of the assembled parts, means mounting the mechanism for movement to a nailing position from one normally clear of the path of movement of the assembled parts, and means to move the nailing mechanism to such nailing position when the assembled parts have reached a position for nailing.

20. In a machine for nailing crate head frames which include rails and posts assembled in rectangular form with the posts between the rails, means to advance the assembled parts to a predetermined position for nailing in a direction lengthwise of the posts, a nailing mechanism to drive nails through the rails and into the posts lengthwise of the latter and from both ends thereof, whereby said mechanism when in nailing position is in the path of movement of the assembled parts, means mounting the mechanism for movement between a nailing position and one clear of the path of movement of the assembled parts, and means functioning in timed relation with the advancing means to move the mechanism to a nailing position after the parts have been advanced to a nailing position and to move the mechanism clear of the nailed head to allow of further advancing movement of the latter out of the machine.

21. In a machine for nailing crate head frames which include rails and posts assembled in rectangular form with the posts between the rails, means to advance the assembled parts to a predetermined position for nailing in a direction lengthwise of the posts, a nailing mechanism to drive nails through the rails and into the posts lengthwise of the latter and from both ends thereof, whereby said mechanism when in nailing position is in the path of movement of the assembled parts, means mounting the mechanism for movement between a nailing position and one above the assembled parts, means to hold the mechanism raised while the assembled parts are being advanced to and subsequently from a nailing position, and means to lower the mechanism to a nailing position when said parts have been advanced to a corresponding position.

22. In a machine for nailing crate head frames which include rails and posts assembled in rectangular form, means to advance the assembled parts to a predetermined position for nailing and in a direction lengthwise of the posts, a nailing mechanism to drive nails through the rails and into the posts, said mechanism including nail chucks alined with but normally above the posts and normally retracted plungers movable into the chucks to force nails therefrom, vertically movable side blocks, means mounting the chucks as a unit with the blocks, supporting means for the plungers including racks parallel to the plungers and slidably supported on the blocks, gears mounted in the blocks and engaging the racks, and means functioning after the assembled parts have reached a nailing position to first lower the blocks to place the chucks in horizontal alinement with the posts and to then cause the gears to rotate in a direction to move the racks in a plunger advancing direction.

ROY G. TAYLOR.